Dec. 5, 1933.  W. E. SOEHRMAN  1,938,156
AIRPLANE CONSTRUCTION
Filed Feb. 19, 1931   7 Sheets-Sheet 1
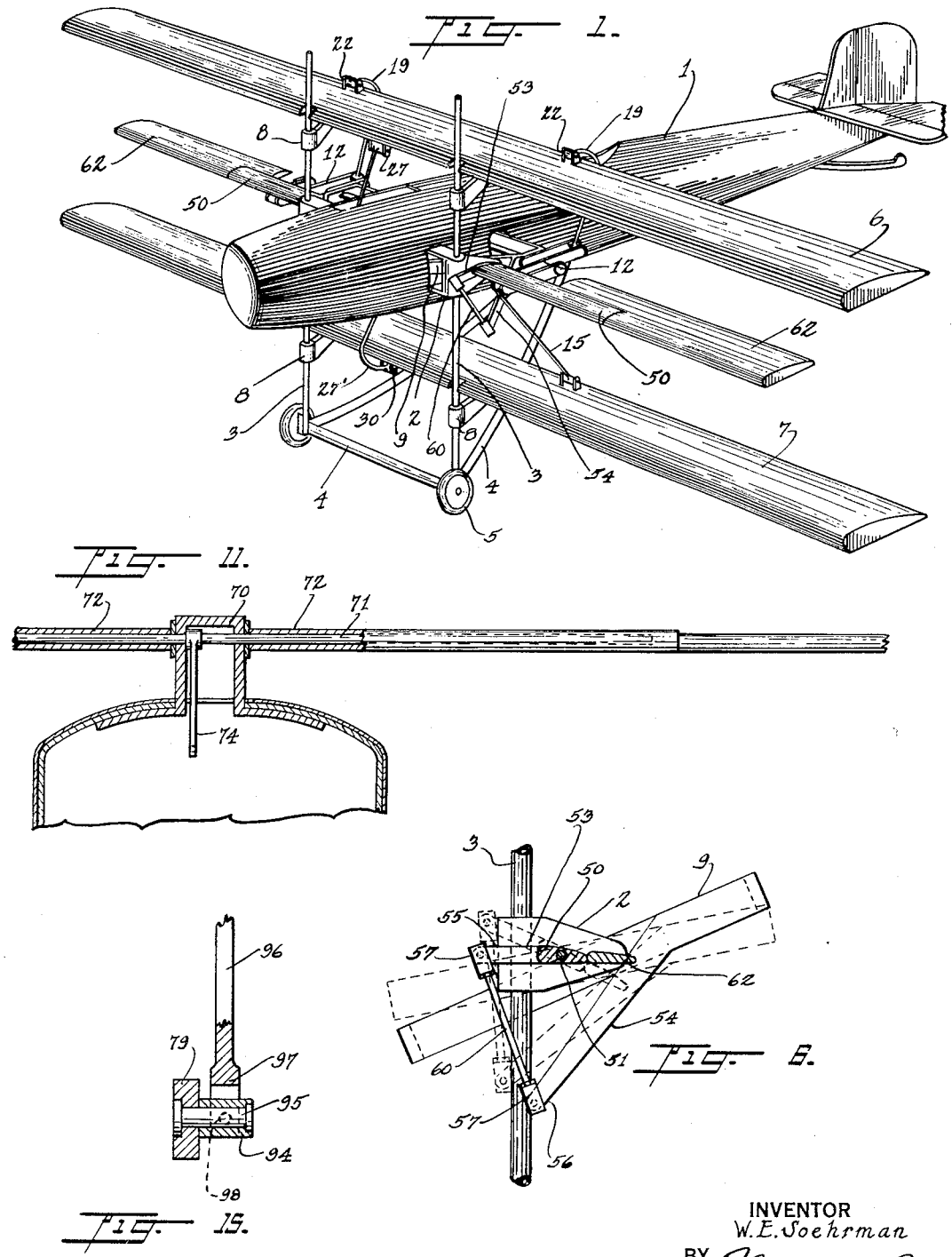
INVENTOR
W. E. Soehrman
BY Munn & Co.
ATTORNEYS Dec. 5, 1933.    W. E. SOEHRMAN    1,938,156
AIRPLANE CONSTRUCTION
Filed Feb. 19, 1931    7 Sheets-Sheet 2
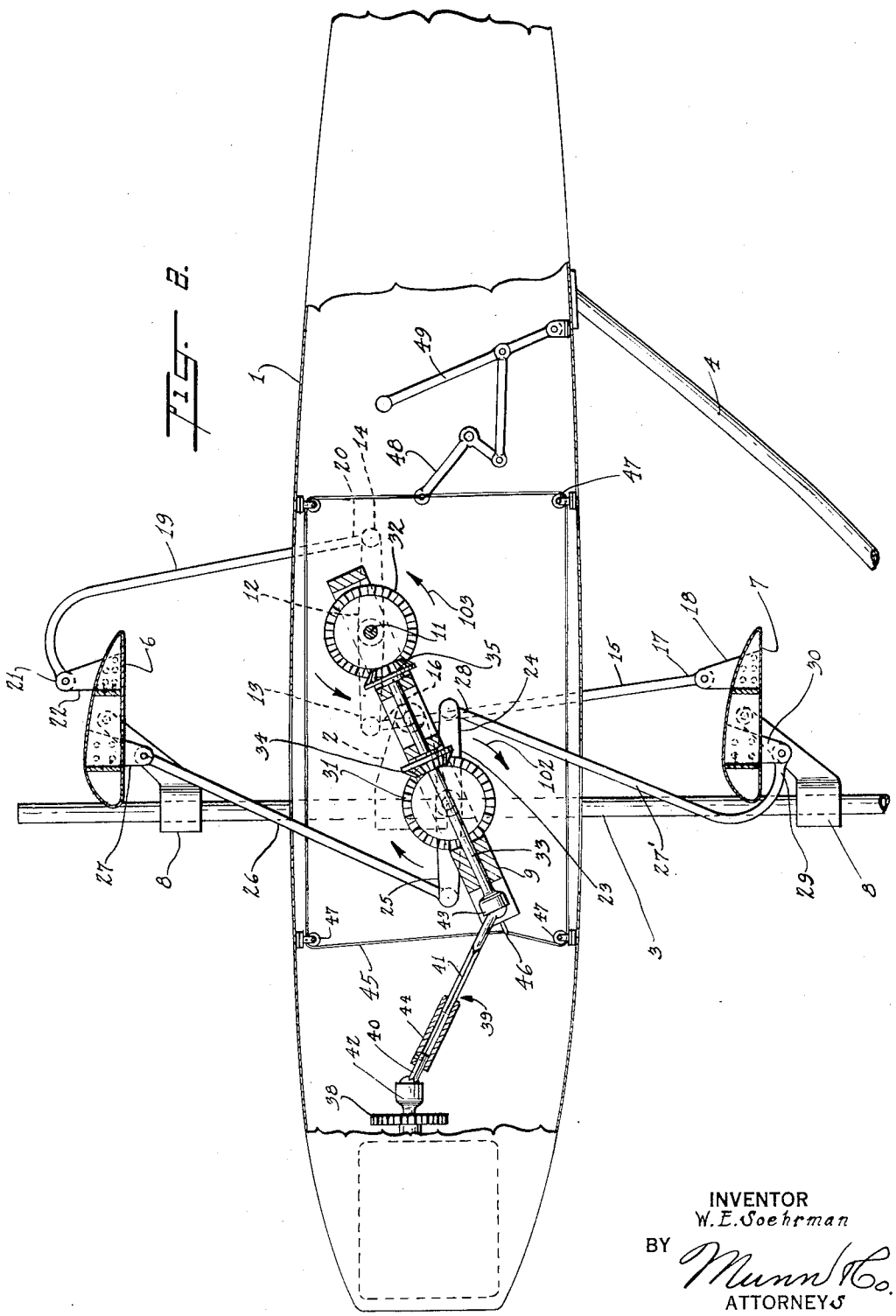
INVENTOR
W. E. Soehrman
BY
Munn & Co.
ATTORNEYS Dec. 5, 1933.   W. E. SOEHRMAN   1,938,156
AIRPLANE CONSTRUCTION
Filed Feb. 19, 1931   7 Sheets-Sheet 3
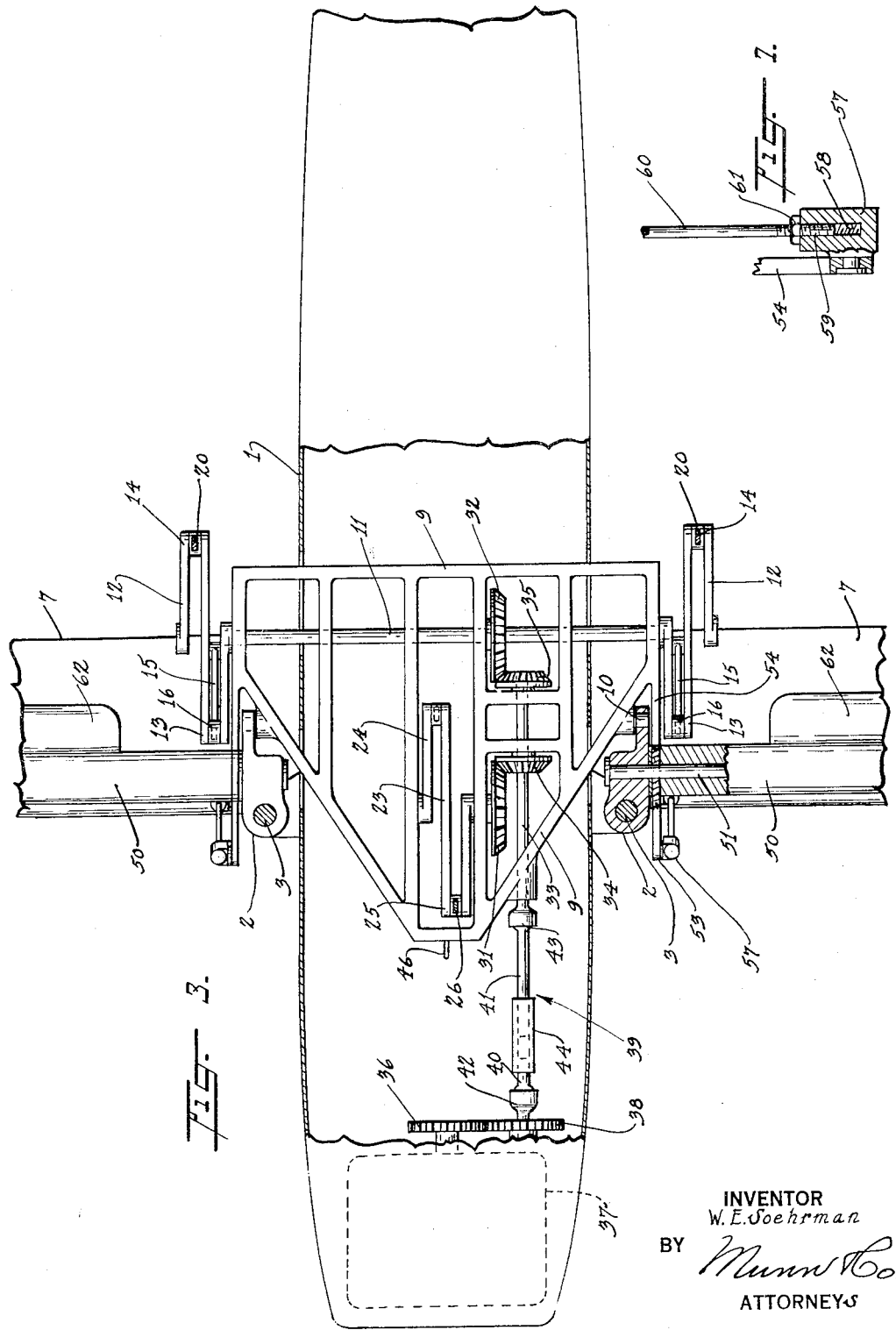
INVENTOR
W. E. Soehrman
BY
Munn & Co.
ATTORNEYS

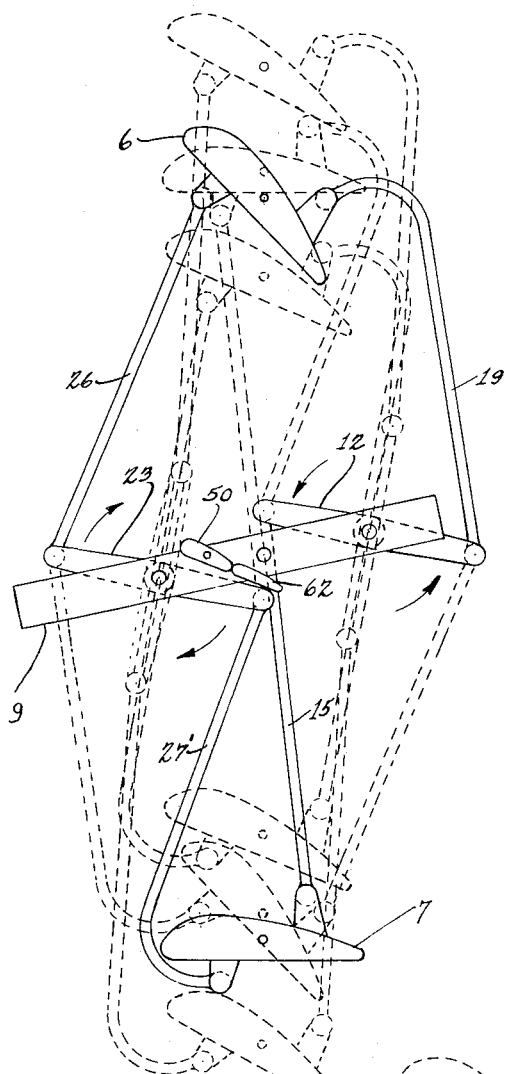
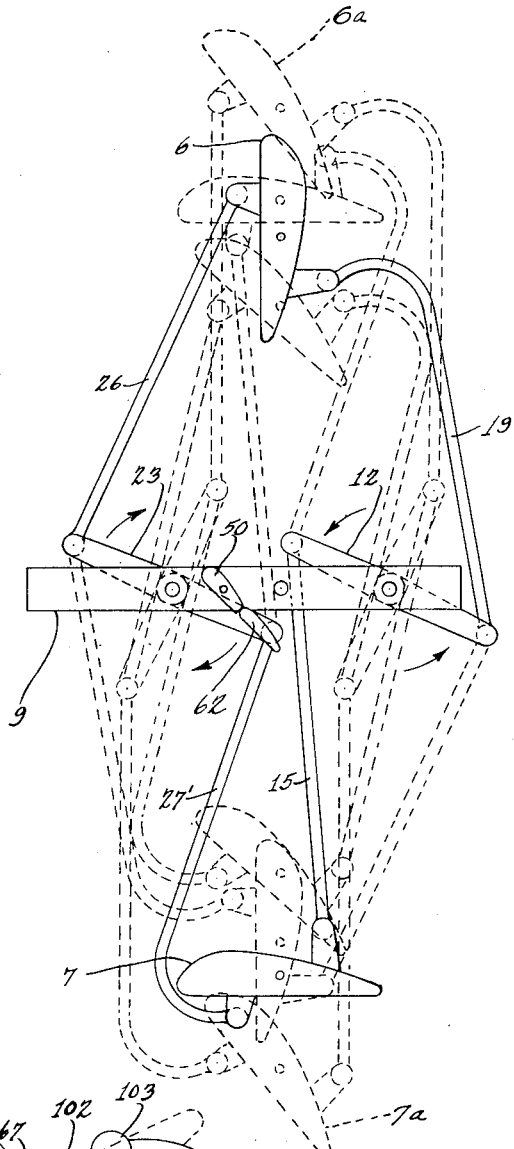
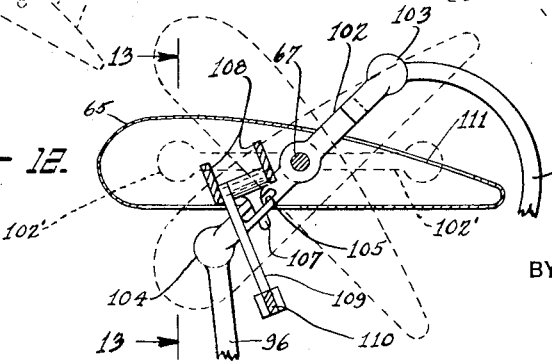

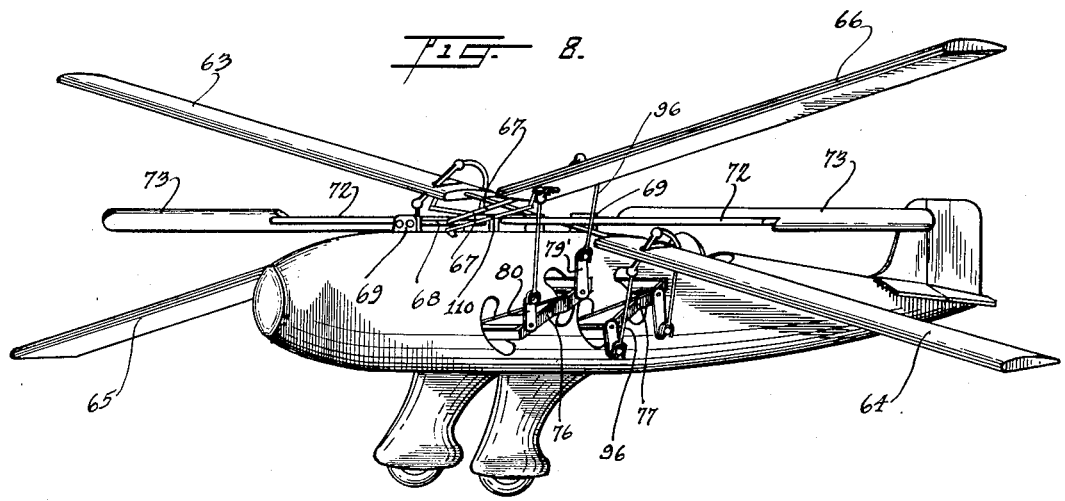
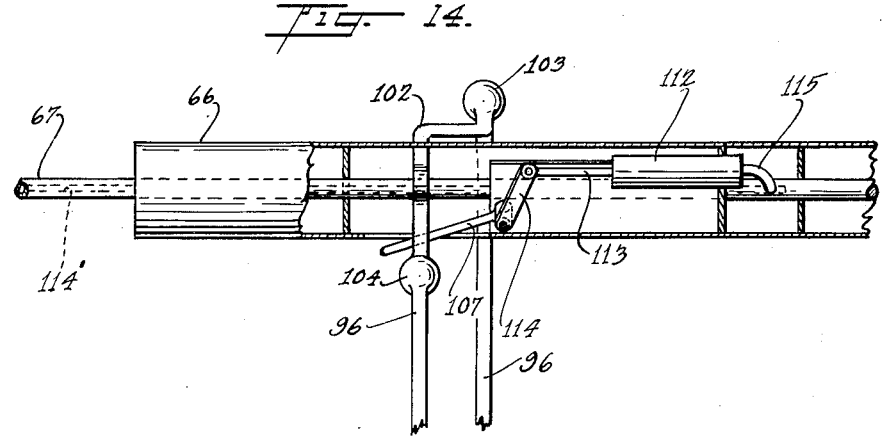
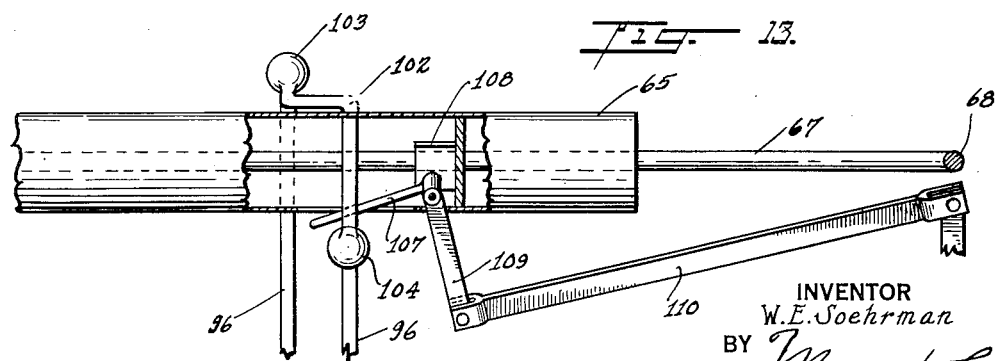

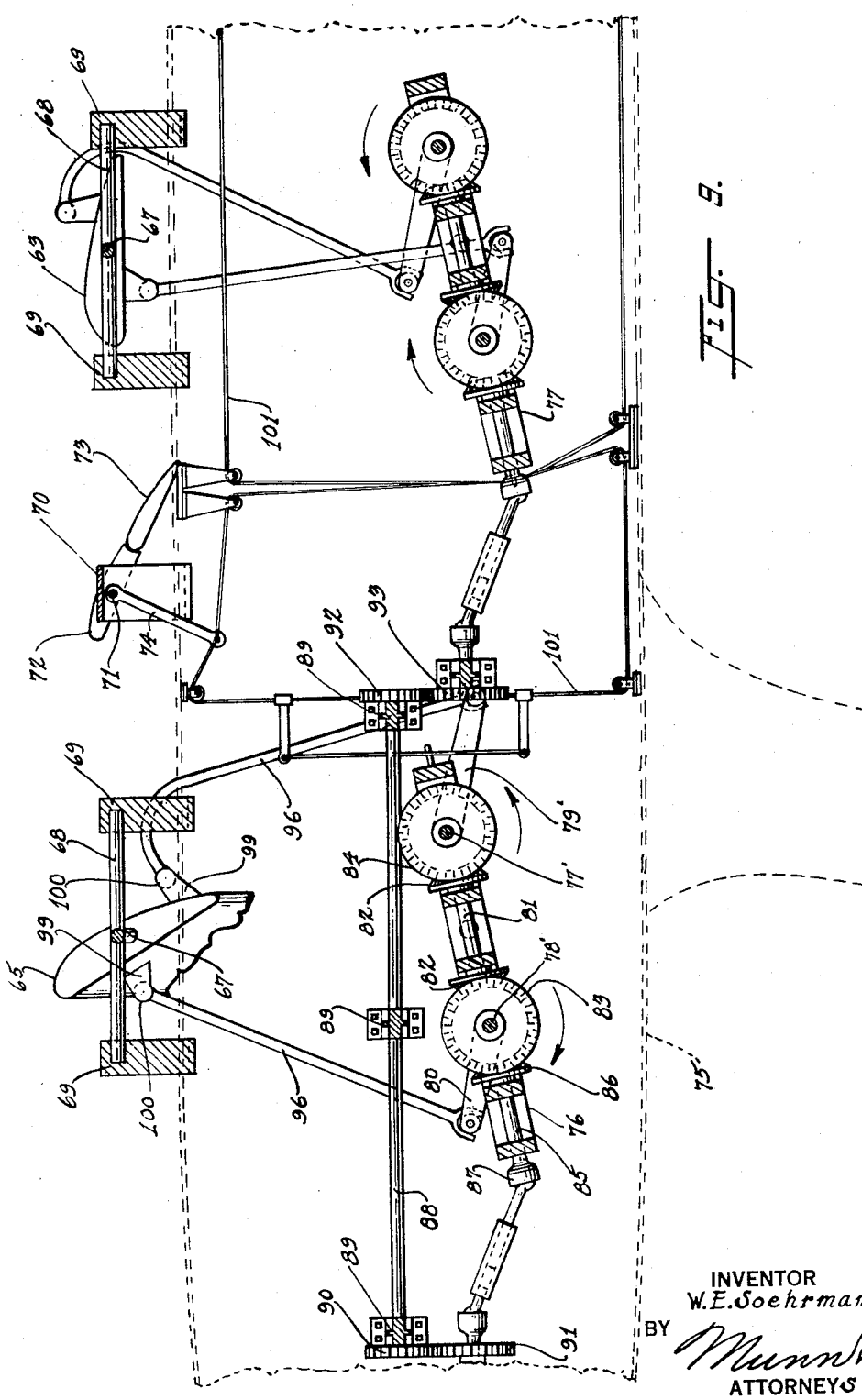

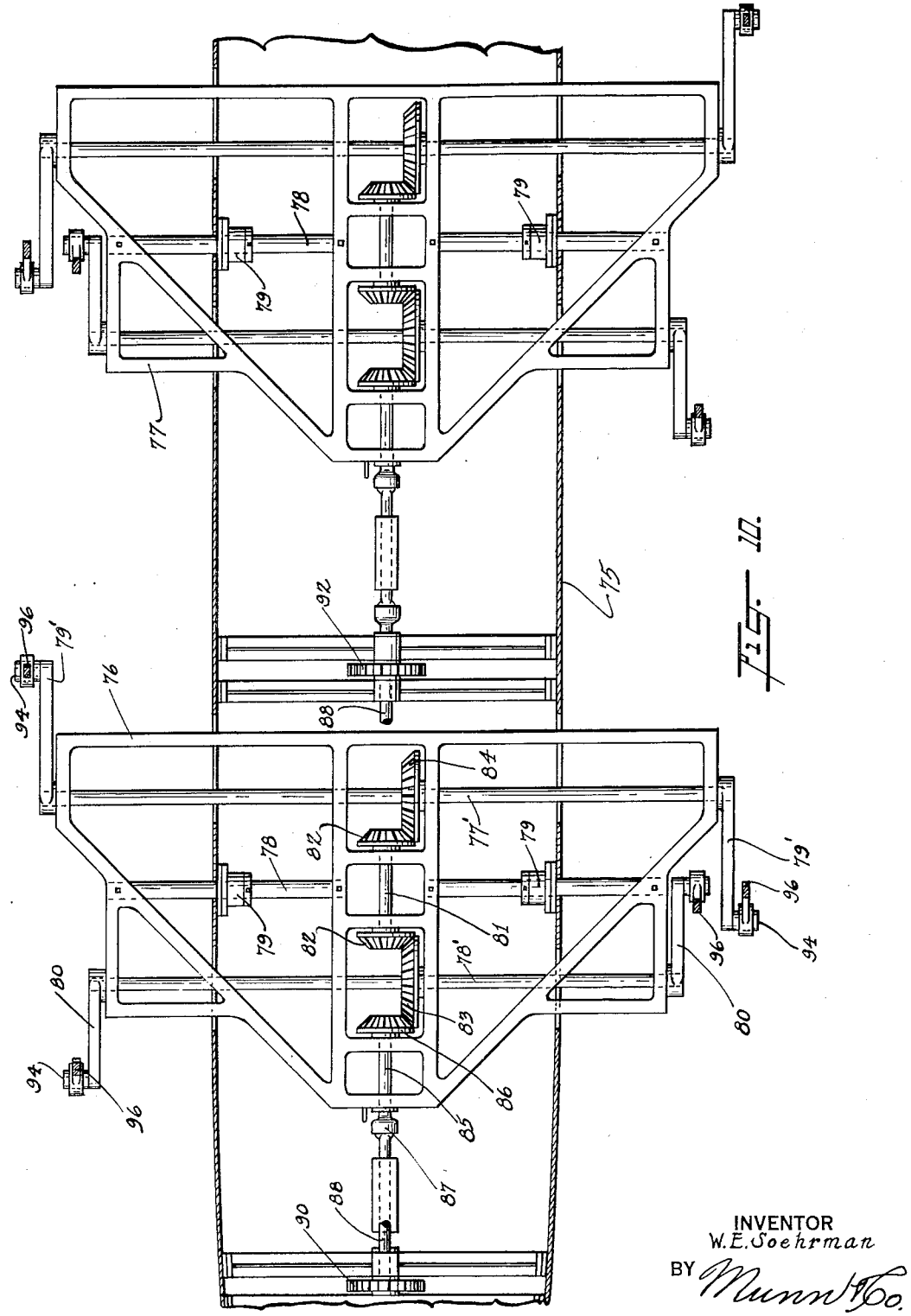

Patented Dec. 5, 1933

1,938,156

UNITED STATES PATENT OFFICE 1,938,156

AIRPLANE CONSTRUCTION

Walter E. Soehrman, Chicago, Ill.

Application February 19, 1931. Serial No. 517,074

13 Claims. (Cl. 244—17)

My invention relates to improvements in airplane constructions, and it consists in the combinations, constructions, and arrangements herein described and claimed.

An object of my invention is to provide an airplane construction which will enable an airplane to rise at a steep angle or vertically.

A further object of my invention is to provide novel means whereby the controls will positively respond at any forward speed or no forward speed.

A further object of my invention is to provide an airplane having an extremely high speed and a low fuel consumption.

A further object of my invention is to provide an airplane which is both lifted and propelled by the wings.

A further object of my invention is to provide an airplane construction having large propelling surfaces.

A further object of my invention is to provide an airplane construction which will operate with little or no noise.

Other objects and advantages will appear in the following specification, and the novel features of the invention will be particularly pointed out in the appended claims.

My invention is illustrated in the accompanying drawings, forming part of this application, in which Figure 1 is a perspective view of an airplane embodying my invention, Figure 2 is a vertical sectional view of a portion of the airplane shown in Figure 1, Figure 3 is a horizontal sectional view of a portion of the airplane shown in Figure 1, Figures 4 and 5 are diagrammatic views showing the positions of the wings in the different stages of their movements, Figure 6 is an enlarged detail view of the structure for moving aileron supporting members, Figure 7 is a detail view of a portion of the structure shown in Figure 6, Figure 8 is an isometric view of another form of airplane embodying my invention, Figure 9 is a vertical sectional view of a portion of the airplane shown in Figure 8, the fuselage thereof being indicated in dotted lines, Figure 10 is a horizontal sectional view of a portion of the airplane shown in Figure 8, Figure 11 is a cross sectional view of the fuselage of the airplane in Figure 8 showing the aileron supporting members and the means by which they are actuated, Figure 12 is a cross sectional view of a wing of the airplane in Figure 8 showing the structure by means of which the wing may be adjustably positioned at various angles with respect to a horizontal plane, Figure 13 is a section taken along the lines 13—13 of Figure 12, Figure 14 shows a structure whereby the mechanism shown in Figures 12 and 13 may be actuated hydraulically, and Figure 15 is a sectional view showing the manner in which a connecting rod of the airplane shown in Figure 8 is connected with a crank shaft arm.

In carrying out my invention I provide an airplane fuselage 1 as shown in Figure 1. Each side of the fuselage 1 is provided with a projecting member or lug 2 which is fixedly connected with the frame of the fuselage. Each of the projecting members 2 is provided with a rod member 3 extending therethrough, said rod members being parallel and the lower ends thereof being connected with the supporting structure 4 carried by the wheels 5. A pair of movable and parallel wings 6 and 7 are respectively positioned above and below the fuselage and are disposed at right angles with respect to the rod and the axis of the fuselage. Projecting arms 8 are slidably or movably mounted on the rod members 3. The arms 8 extend through slots in the wings 6 and 7 and are pivotally connected with the internal bracing of the wings whereby the wings may be moved at any angle from parallel to vertical with respect to the horizontal. As shown in Figure 3 a frame member or cradle frame 9 is disposed within the fuselage and extends without the fuselage, said frame being positioned between the projecting members 2. The frame 9 is provided with projecting portions 10 receivable in the extended portions 2 whereby the frame is pivotally or movably carried by the projecting portions 2. A crank shaft 11 extends through the frame 9 by which it is carried and is transversely positioned with respect to the fuselage 1. A crank arm 12 is fixedly mounted on each end of the shaft 11 on the exterior of the frame 9. Each of the crank arms 12 is provided with diametrically opposed and offset end portions 13 and 14.

Connecting rods 15 has one end 16 rotatably mounted on the end portion 13 of the crank arm and the other end 17 pivotally connected to a projecting member 18 which is disposed adjacent the top rear edge of the lower wing 7 and fixedly connected with the internal bracing thereof. The opposite end portions 14 of the crank arms 12 are provided with connecting rods 19 having an end 20 rotatably mounted thereon and the other end 21 pivotally connected with a projecting member 22 disposed on the top of and adjacent the rear edge of the top wing 6, said projecting member being fixedly connected with the internal bracing of said wing. A crank arm 23 having diametrically opposed and offset end portions 24 and 25 is rotatably mounted in the frame 9. A connecting rod 26 has an end rotatably mounted on the end portion 25 of the crank arm 23 and the other end pivotally connected with a projecting member 27, said projecting member being positioned on the lower side of the wing 6 adjacent the front edge thereof and connected with the internal bracing of the wing in the same manner as the projecting members 22 and 18. A connecting rod 27' has one end 28 rotatably connected with the crank arm end 24 and the other end 29 pivotally connected with a projecting member 30 disposed on the lower side of the wing 7 adjacent the front edge thereof and connected with the internal bracing of the wing 7 in the same manner as the projecting member 27. The crank arm 23 and the crank shaft 11 are provided with beveled gears 31 and 32 respectively. A driven shaft 33 is rotatably carried by the frame 9 and is provided with beveled gears 34 and 35 in mesh with the beveled gears 31 and 32 respectively.

A gear wheel 36 is connected with the drive shaft of an engine 37 and is in mesh with a gear wheel 38. A shaft 39 connects the gear wheel 38 with the driven shaft 33 and comprises spaced-apart segments 40 and 41. A universal joint 42 connects one end of the segment 40 with the gear wheel 38 and a similar universal joint 43 connects one end of the segment 41 with the driven shaft 33. The other end of the segment 40 is fixedly connected with a collar 44 and the other end of the shaft 41 is slidably but not rotatably disposed within the collar 44. As shown in Figure 2 a control wire 45 is connected with the frame 9 by any desirable means such as an eyelet 46. The control wire 45 passes over a series of pulleys 47 which are connected to the fuselage frame and is connected with a lever 48 actuated by a control stick 49.

In referring to Figures 1 and 3 it will be seen that aileron supporting members 50 are fixedly mounted on shafts 51 which in turn are rotatably carried by the projecting members 2. A lever arm 53 is fixedly connected with the shaft 51 or the aileron supporting members 50. As shown in Figures 1 and 3 the movable frame 9 is provided with a lever arm 54. The ends 55 and 56 of the lever arms 53 and 54, respectively, are each provided with a member 57 pivotally connected therewith as shown in detail in Figure 7. The members 57 are provided with threaded openings 58 for receiving the threaded ends 59 of a rod 60, said rod being the means for connecting the lever arm 54 with the lever arm 53. The ends of the rod 60 and the openings 58 in the members 57 are threaded for the purpose of adjustment whereby the distance between the members 57 may be increased or decreased.

Nuts 61 are provided for locking the rod 60 in its adjusted position with respect to the members 57. Ailerons 62 are movably mounted on the aileron supporting members 50. The ailerons 62 besides being movable with the aileron supporting members 50 are movable with respect to the aileron supporting members by means of the standard aileron controls not shown. Thus it will be seen that the aileron supporting members 50 and the ailerons 62 are moved by any movement of the cradle 9 and that the ailerons 62 are movable independently of the cradle 9.

In Figure 8 I have shown another form of my invention in which two pairs of wings are provided. One pair of wings is designated by the numbers 63 and 64 and the other pair of wings is designated by the numbers 65 and 66. The wings of each pair are oppositely disposed on each side of the fuselage and transversely positioned with respect thereto. The wings are rotatably mounted on individual rods or bar members 67, the end of each bar member being rigidly connected with an individual shaft member or bar member 68 transversely positioned with respect to the bar member 67. The shaft members 68 of the paired wings are arranged in parallelism, said parallel shafts being in axial alignment with the corresponding parallel shafts connected with the other pair of wings. The paired shaft members 68 are disposed between a pair of upright or projecting members 69 which are connected with the frame of the fuselage, the ends of said shaft members being rotatably or pivotally mounted in the upright members 69. The paired wings 65 and 66 are positioned in front of the paired wings 63 and 64. An upright member or bearing member 70 is connected with the frame of the fuselage and is positioned at an intermediate point between the paired wings as shown in Figure 9.

The member 70 is in alignment with the upright members 69. A shaft 71 is rotatably mounted in the upright member 70 through which it extends. Aileron supporting members 72 are fixedly mounted on the shaft 71. Ailerons 73 are movably connected with the aileron supporting members 72 in the same manner as the ailerons 62 are connected with the aileron supporting members 50 shown in Figure 1, said ailerons 73 being movable with the aileron supporting members 72 and movable with respect to the aileron supporting members 72 in the same manner as the ailerons 62. A lever arm 74 has one end fixedly mounted on the shaft 71 and extends within the fuselage 75 as shown in dotted line position in Figure 9. As shown in Figure 10 a pair of frame or cradle members 76 and 77 is disposed within the fuselage 75. The frames 76 and 77 are pivotally or rotatably mounted by means of shafts 78 fixedly connected therewith and extending through bearing members 79 connected with the fuselage frame. Since the construction of these frames and their associated mechanisms are identical, a description of one will suffice for both. For purposes of illustration let us consider the frame 76 and its associated structure. Extending through the frame 76 is a pair of crank shafts 77' and 78' which are rotatably mounted therein. Crank arms 79' and 80 are fixedly mounted on the ends of the crank shaft 77' and 78' respectively and are positioned outside of the frame 76. It will be noted that the crank shaft 77' is longer than the crank shaft 78' and that the crank arms 79' mounted on the ends thereof are longer than the crank arms 80. The reason for this will be hereinafter explained.

A shaft 81 is rotatably disposed within the frame 76 and is provided with beveled gears 82 fixedly mounted thereon and in mesh with beveled gears 83 and 84 fixedly mounted on the shafts 77' and 78' respectively. A shaft 85 is rotatably carried by the frame 76 and is provided with a beveled gear 86 fixedly mounted on an end thereof and in mesh with the gear 83. The other end of the shaft 85 is provided with a universal joint 87 whereby the shaft 85 is connected with a source of power in the same manner in which the shaft 33 shown in Figure 3 is connected with the shaft on which the gear 38 is mounted. A shaft 88 is positioned above the movable frame 76 and is rotatably carried by bearing supporting members 89 connected with the frame of the fuselage. A gear 90 is mounted on one end of the shaft 88 and is in mesh with a driving gear 91. A gear 92 is fixedly mounted on the other end of the shaft 88 and is in mesh with the driven gear 93. The mechanism carried by the frame 77 is connected with the gear 93 in the same manner as the shaft 85 is connected with the gear 91.

As shown in Figure 10 the crank arms 80 are mounted on the shafts 78' in diametrically opposed positions. As shown in Figure 15 a collar 94 is rotatably mounted on each of the crank arms 79' and 80 by means of a bearing pin 95 extending through the collar 94 and the crank arm. A connecting rod 96 is provided with a forked or U-shaped end 97 which is pivotally connected with the collar 94 by means of pins 98. The opposite end of each connecting rod is connected with a flange member 99 by means of a ball and socket joint 100 as shown in Figure 9. The flange members 99 are connected with the internal bracing of their respective wings in the manner hereinbefore described.

It will be seen by referring to Figure 8 that each of the wings 63, 64, 65, and 66 is provided with two projecting members 99. One of the projecting members is positioned on the lower side of the wing adjacent the front edge thereof and is connected by means of a connecting rod 96 with one of the crank arms 80. The other projecting member is positioned adjacent the rear edge of the wing on the top side thereof and is connected with one of the crank arms 79 by a connecting rod 96.

A system of control wires 101 is provided for connecting the movable frames 76 and 77 with a control lever not shown. The control wires 101 are also connected with the lever arm 74 whereby the aileron supporting members may be moved when the frames 76 are moved.

From the foregoing description of the various parts of the device, the operation thereof may be readily understood.

In referring to Figure 2 it will be seen that the beveled gears 31 and 32 are rotated in the direction of the arrows 102 and 103, respectively, by means of the driven shaft 33. The crank arms 23 and 12 will therefore be rotated in the same direction as the respective gears with which they are connected; namely, 31 and 32. When the crank arms 23 and 12 are thus rotated the wings 6 and 7 are reciprocated oppositely in a vertical plane. When the frame 9 is in the position shown in Figure 2, the wings 6 and 7 remain horizontally positioned throughout their reciprocable movement at which time the airplane will not be propelled because when one wing is moving upwardly the other wing is moving downwardly and, since both wings are horizontally positioned, the air pressure will be equalized. When it is desired that the airplane be put in flight the frame 9 is first moved to the position shown in Figure 5. In Figure 5 the movements of the wings 6 and 7 are shown when the frame 9 is in a horizontal position. When the frame 9 is in the position shown in Figure 5 the wings 6 and 7, when moving upwardly, do so at an angle of 90° with the horizontal but when they move downwardly they are horizontally positioned. For instance, in Figure 5 the wing 6 is shown in the position of its upward movement at which time it will be positioned at an angle of 90° with the horizontal. At the same time the wing 7 is shown in the position of its downward movement at which time it will be horizontally positioned. Thus it will be seen that air pressure created by the downward movement of the wing 7 overcomes the air resistance created by the upward movement of the wing 6 thereby causing the plane to be lifted. As the wing 6 reaches the peak of its upward movement it moves through the position shown at 6a for assuming a horizontal position during its downward movement. At the same time the wing 7 reaches the peak of its downward movement and passes through the position shown at 7a for assuming the position at an angle with the horizontal which it takes during its upward movement. Thus it will be seen that when the wing 7 is moving downwardly in a horizontal plane for lifting the airplane the wing 6 is moving upwardly at an angle of 90° with the horizontal plane and that when the wing 6 is moving downwardly in a horizontal plane for lifting the airplane the wing 7 is moving upwardly at an angle of 90° with the horizontal.

When the wings move upwardly in a vertical position and downwardly in a horizontal position at proper speed, it will readily be seen that the airplane will be lifted vertically from the ground and that there will no forward movement. When the airplane has reached a desired altitude and it is desired that the same be propelled forwardly, the frame 9 is then moved from the horizontal position shown in Figure 5 toward the position shown in Figure 2 and may be disposed in any position therebetween. For the purpose of illustration, the frame 9 is shown in its intermediate position in Figure 4 at which time the wings when moving upwardly do so at an angle of 45° with the horizontal. It will readily be seen that when the wings move upwardly at any angle between a vertical and a horizontal position they cut the air at an angle with respect to their direction of movement and thereby propel the airplane forwardly. It will also be readily understood that as the angle which the wings make with the horizontal when moving upwardly is decreased the speed of the airplane will be increased. The structure herein described has been designed so that it functions when the wings are traveling at the angles mentioned. However, it will be readily seen that by merely changing the proportions of the mechanism that the wings will move at any desired angle with respect to the horizontal while traveling either upwardly or downwardly. The wings may be disposed in a horizontal position for gliding purposes. It will readily be seen that the wings may be positioned at any angle with respect to the horizontal whether or not the engine is running.

As has been stated before the aileron supporting members 50 and the ailerons 62 are moved as a unit when the frame 9 is moved, the ailerons 62 being movable independently of the aileron supporting members 50 by means of the standard controls. The purpose of this construction is to adapt the aileron position to any particular rate of forward motion. When there is no forward motion the ailerons are adapted to cause the airplane to respond to the controls due entirely to the downward air flow caused by the wing motion. When the airplane has a considerable forward motion the ailerons are automatically changed to a position whereby the airplane responds to its controls due to horizontally moving air relative to the airplane because of its forward motion.

The structure of the form of my device shown in Figure 8 provides means for oscillating or flapping the wings for propelling the airplane. In this structure the wing 65 is swung downwardly when the wing 66 is swung upwardly, and vice versa. It will readily be seen that the two pairs of wings are for the purpose of balancing the plane since a wing must be swinging downwardly on each side of the fuselage for suspending the plane in the air and a wing must be moving upwardly on each side of the fuselage for propelling the plane through the air. The position of the wings during their upward and downward movements is the same as hereinbefore described concerning the form shown in Figure 1, the position of the wings during their upward movement being of course determined by the position of the frames 76 and 77.

The second pair of wings 63 and 64, see Figure 8, is provided for counterbalancing the wings 65 and 66 and, in addition, also serves as an extra propelling and lifting means. It will readily be seen, however, that one pair of wings such as wings 63 and 64 may be dispensed with provided the structure is adapted for moving the wings 65 and 66 downwardly at the same time and upwardly at the same time. However, when only one pair of wings is used on the plane shown in Figure 8, the intermittent propelling and lifting force propels and lifts the plane jerkily or spasmodically. The use of two pairs of wings provides a smoother and more constant propelling and lifting force. One wing might also be used instead of two on the plane shown in Figure 1 but it would also result in a jerky propelling and lifting force which the use of two wings eliminates.

In referring to Figure 10 it will be seen that the shaft 77' is longer than the shaft 78' so that the crank arms 79 and 80 will not interfere when rotating. The crank arms 79' must necessarily be made longer than the crank arms 80 since that portion of the wings with which they are connected is a greater distance from the axis of the shaft 68 and therefore travels through a greater arc than does that portion of the wings with which the crank arms 80 are connected. It may be desired that the wings of the structure shown in Figure 8 be positioned at a declined angle with respect to the horizontal when being swung downwardly instead of being in a horizontal position as herein described. Since the structures by which this is accomplished are the same for all the wings, I will confine my description to the construction as applied to the wing 65. An arm 102 is rotatably mounted on the rod 67. The ends of the arm 102 are provided with socket means 103 and 104 for being connected with the connecting rods 96. The arm 102 is provided with a slot 105 through which an arm 107 extends. The arm 107 has one end pivotally mounted on a supporting frame 108 which is connected with the internal bracing of the wing 65. The arm 107 is fixedly connected with a lever arm 109 which is connected with an actuating arm 110 shown in cross section in Figure 12. When the movable frame 76 is positioned horizontally the wing 66 will normally move upward vertically and downward horizontally as shown in Figure 5. When the lever arm 109 is actuated by the arm 110 the arm 107 moves the arm 102 to the position 102' relative to the wing as shown in Figure 12. When in this position it will readily be seen that the wing 66 will move upwardly at an angle of 45° with the horizontal instead of at 90° and that it will also move downwardly at a negative angle of 45° with the horizontal instead of moving downward in a horizontal position.

When the arm 102 is in the position 102' shown in Figure 12 it will be seen that the ball and socket portions 103 and 104 will be disposed or partially disposed within the wing 66. The wing is provided with openings 111 for permitting the arm 102 and the ends of the connecting rods 96 to move therewithin. It will readily be understood however that the wing may be adjusted for assuming various angles of inclination and declination with respect to the horizontal. It will be seen by referring to Figures 8 and 13 that the actuating arm 110 must be pivotally mounted adjacent the pivotally mounted bar 68 whereby both members will have closely positioned pivotal points so that the wing will not be moved about its longitudinal axis by the lever 110 while moving upwardly and downwardly unless the lever 110 is actuated.

In Figure 14 I show a hydraulic means for actuating the arm 102, said means comprising a hollow cylinder 112 having a piston disposed therein which is connected with a rod 113. The rod 113 is connected with a lever arm 114 which, in turn, is fixedly connected with the arm 107 for moving the arm 102. The shaft 67 on which the wing 66 is mounted is provided with a longitudinal passageway 114' therethrough through which the liquid flows, said passageway being in communication with the interior of the cylinder 102 by means of a pipe 115. It will be seen by referring to Figures 1 and 8 that the tails of the airplane bodies are constructed in the usual manner. It will readily be understood that an additional smaller wing unit may be mounted on the tail of the fuselage in place of the conventional tail surface in the same manner as herein described and connected with the engine by means of a shaft mounted in the fuselage in the same manner as the shaft 88 shown in Figure 9. The purpose of this is to permit greater control so that the airplane may rise without any forward motion. Some forward motion will be required when the conventional tail is used so that the same will respond to the controls.

Referring to Figure 12, the socket joints 103 and 104 are placed on a line with and also equidistant on either side of the wing rod 67. They may, however, be placed anywhere along this line. The socket joints 103 may be placed at 67 and 104 on an extension of line 103—104 keeping the distance between 103—104 approximately the same. In this way the joint 103 with its connecting rod (straight instead of bent), crank, and shaft would do all the heavy work of oscillating the wing while the socket joint 104 with its connecting rod, crank, shaft, and gears 82, 83, and 84 would perform the lighter work of feathering the wings. Each set of wings would therefore have one crank shaft 77', see Figure 10, for oscillating purposes and one shaft 78' for feathering purposes. Frame 76 would move around the shaft 77' instead of 79 keeping shaft 77' rotatable in bearings fixedly mounted on frame 75. Power may then be carried to shaft 77' without the use of universal joints. The control lever 49, together with a control lever not shown for actuating 110 are placed side by side so that they may be grasped either singly or as one lever. When both are at the end of their travel toward the pilot, the airplane should be in gliding position. The lever should be of the locking type of which there are many and need not be shown so that their position will be changed only when so desired by the pilot. Thus it will be seen that only one compound control lever has been added to the control system of the conventional airplane.

The joystick, aileron, elevator, and rudder system of control is the same as in the conventional airplane and therefore has not been shown. Wires actuating ailerons should pass near the aileron supporting member shafts 51 in Figure 6 or the aileron supporting shaft 71 of Figure 9 so that the movements of the aileron supports 50 and 72 will not interfere with the controls.

I claim:

1. The combination of an aircraft body, wings movably carried by said body and reciprocable with respect thereto, said wings being movable about their longitudinal axes, means for reciprocating the wings and for moving said wings about their longitudinal axes simultaneously with their reciprocation, and means for positioning the wings at any angle with respect to their direction of travel.

2. The combination of an aircraft body, wings movably carried by said body and reciprocable with respect thereto, said wings being movable about their longitudinal axes, power means for reciprocating the wings, means whereby said wings may be positioned at any angle when traveling in one direction and at a different angle when traveling in the other direction, and means for shifting said wings from one position to the other position as the direction of travel is changed.

3. The combination of an aircraft body, wings movably carried by said body and reciprocable with respect thereto, said wings being movable about their longitudinal axes, power means for reciprocating the wings, means whereby said wings may be positioned at any angle when traveling in one direction and at a different angle when traveling in the other direction, and means associated with said last named means and power means for automatically shifting the wings from one position to the other position as the direction of travel is changed.

4. The combination of an aircraft body, wings movably carried by said body and reciprocable with respect thereto, said wings being movable about their longitudinal axes, means for reciprocating the wings in opposite directions, means for moving said wings about their longitudinal axes simultaneously with their reciprocation, and means for positioning the wings at any angle with respect to their direction of travel.

5. The combination of an aircraft body, wings movably carried by said body and reciprocable with respect thereto, said wings being movable about their longitudinal axes, means for reciprocating the wings, means for moving said wings about their longitudinal axes simultaneously with their reciprocation, means for positioning the wings at any angle with respect to their direction of travel, and means for counterbalancing said body.

6. The combination of an aircraft body, wings movably mounted on the body and movable about their longitudinal axes, a shaft supporting means mounted on the body, a pair of shafts rotatably mounted on the supporting means, means operatively connecting said shafts with the wings for reciprocating the wings when the shafts are rotated, said supporting means being movable for varying the relative elevational positions of the shafts for variably positioning the wings at an angle with respect to their direction of travel.

7. The combination of an aircraft body, wings movably mounted on the body and movable about their longitudinal axes, a shaft supporting means mounted on the body, a pair of shafts rotatably mounted on the supporting means, means operatively connecting said shafts with the wings for reciprocating the wings when the shafts are rotated, said supporting means being movable for varying the relative elevational positions of the shafts for variably positioning the wings at an angle with respect to their direction of travel, and means for variably positioning the wings at an angle with respect to their direction of travel independently of said supporting means.

8. The combination of an aircraft body, wings movably mounted on the body and movable about their longitudinal axes, a shaft supporting means mounted on the body, a pair of shafts rotatably mounted on the supporting means, means operatively connecting said shafts with the wings for reciprocating the wings when the shafts are rotated, said supporting means being movable for variably determining the positions of the wings with respect to their direction of travel.

9. The combination of an aircraft body, wings movably carried by said body and movable about their longitudinal axes, means for reciprocating the wings, manually operable means for adjustably positioning the wings, and auxiliary means associated with the wings for adjustably positioning the same with respect to their direction of travel, independently of said last named means.

10. The combination of an aircraft body, wings movably carried by said body and reciprocable with respect thereto, said wings being movable about their longitudinal axes, power means for reciprocating the wings, means whereby said wings may be positioned at an angle when traveling in one direction and at a different angle when traveling in the other direction, manually operable means for adjustably positioning the wings with respect to their direction of travel, and auxiliary means associated with the wings for adjustably positioning the same with respect to their direction of travel, independently of said last named means.

11. The combination of an aircraft body, wings movably carried by said body and movable about their longitudinal axes, means for reciprocating the wings, manually operable means for adjustably positioning the wings, ailerons associated with the aircraft, and means associated with said last-named means and operable thereby for adjustably positioning the ailerons.

12. The combination of an aircraft body, wings movably carried by said body and reciprocable with respect thereto, said wings being movable about their longitudinal axes, power means for reciprocating the wings, means whereby said wings may be positioned at an angle when traveling in one direction and at a different angle when traveling in the other direction, manually operable means for adjustably positioning the wings with respect to their direction of travel, ailerons associated with the aircraft, and means associated with said last-named means and operable thereby for adjustably positioning the ailerons.

13. The combination of an aircraft body, wings movably mounted on the body and movable about their longitudinal axes, a shaft supporting means mounted on the body, a pair of shafts rotatably mounted on the supporting means, means operatively connecting said shafts with the wings for reciprocating the wings when the shafts are rotated, said supporting means being movable for varying the relative elevational positions of the shafts for variably positioning the wings at an angle with respect to their direction of travel, ailerons associated with the aircraft, and means associated with the supporting means and operable thereby for adjustably positioning the ailerons.

WALTER E. SOEHRMAN.